United States Patent [19]

Ohta et al.

[11] 4,078,623

[45] Mar. 14, 1978

[54] SCALING DEVICE FOR AN ELEVATOR CAR

[75] Inventors: Masatoshi Ohta, Mito; Norihiko Mitsui; Rokuro Miyazaki, both of Katsuta, all of Japan

[73] Assignee: Hitachi, Ltd., Tokyo, Japan

[21] Appl. No.: 637,377

[22] Filed: Dec. 3, 1975

[30] Foreign Application Priority Data

Dec. 9, 1974 Japan ................................ 49-140505

[51] Int. Cl.[2] ...................... G01G 23/18; G01G 19/14; G01G 19/52

[52] U.S. Cl. ....................................... 177/45; 177/147; 177/132

[58] Field of Search ................... 177/45, 46, 147, 137, 177/132; 340/19 R

[56] References Cited

U.S. PATENT DOCUMENTS

| | | | |
|---|---|---|---|
| 823,455 | 6/1906 | Willcox | 340/19 R X |
| 1,061,514 | 5/1913 | Anderson | 340/19 R |
| 1,284,960 | 11/1918 | Albert | 177/45 |
| 3,559,204 | 1/1971 | Dashper | 177/45 X |

FOREIGN PATENT DOCUMENTS

| | | | |
|---|---|---|---|
| 739,966 | 11/1955 | United Kingdom | 177/132 |

*Primary Examiner*—George H. Miller, Jr.
*Attorney, Agent, or Firm*—Beall & Jeffery

[57] ABSTRACT

A scaling device for weighing load applied on an elevator car floor to prevent overloading operated by detecting the amount of deformation of rubber insulators mounted under the car floor.

Load detecting beams are provided under the car floor to detect the deformation of the rubber insulators, and each end of the load detecting beams is loosely jointed to an opposite side of the car floor.

When the rubber insulators deform by the load applied on the floor, the load detecting means subside in conformity to the deformation of the rubber insulators and a load detecting switch mounted below the car floor is switched on by the subsidence of the load detecting beams as the load exceeds the rated load, thereby to stop the operation of the car.

17 Claims, 6 Drawing Figures

SCALING DEVICE FOR AN ELEVATOR CAR

BACKGROUND OF THE INVENTION

This invention relates to a scaling device for elevator cars and more particularly to such a scaling device that is so constructed as to stay free of any influences by deformation of a car floor.

Generally in elevators or lifts, in order to prevent overloading, there is provided a scaling device for weighing load of the weight of passengers applied on the car floor so that the car will not operate when it is oveloaded.

In conventional scaling devices for elevator cars, a load is detected by detecting the amount of deformation of rubber vibration insulators, which are mounted at each corner on the bottom of the car floor to reduce the vibration of the car floor. Load detecting beams, each end of which is rigidly jointed to the car floor, are provided at the underside of the car floor and arranged to subside in conformity to the deformation of the rubber insulators. A load detecting switch is mounted on a supporting frame on which the car floor is fixed through the rubber vibration insulators. In this arrangement, the rubber insulators deform by the load on the car floor and the load detecting beams subside in conformity to the deformation of the rubber insulators. When the load is in excess of the predetermined weight, the detecting beams turn on the load detecting switch thereby to stop the operation of the car. Under a non-loaded condition, the gap between the detecting beams and the detecting switch is adjusted such that it becomes equal to the amount of the deformation of the rubber insulators at a state in which the rated load is applied on the floor. Such a gap adjustment has been made after the installation of the car by loading a weight corresponding to the rated load.

However, as such a gap adjustment is practiced at a site of a car installation, it is necessary to carry out the work under the car floor in a narrow car passage, so that the workability of the gap adjustment is extremely bad and it is very difficult to provide consistent accuracy.

Another problem associated with the conventional scaling device for an elevator car arises from deformation of the car floor by the weight of the load on the floor. That is, when a load is applied, the car floor deforms in bow-shape and the rubber insulators do not subside uniformly but each is slanted at its upper surface where the car floor is fixed. As a result, the detecting beams rigidly jointed along with the rubber insulators on the car floor receive a bending moment at both ends thereof and flex in bow-shape. Therefore, in addition to the flexure caused by deformation of the rubber insulators, the detecting beams are further flexed at their middle portion owing to the bending moment. Therefore it is necessary to adjust the gap between the detecting beams and the detecting switch, considering not only deformation of the rubber insulators but also the flexure of the detecting beams by deformation of the car floor.

The amount of flexure of the detecting beams varies according to rigidity of the car floor or size of it. So that it is difficult to determine the gap from a calculated value of deformation of the rubber insulators before the installation of the car, hence it is necessary to adjust the gap by loading a weight at the site after the installation of the car.

In an alternative system, two load detecting switches are employed, one is provided at the underside of the car floor close to one rubber insulator, and the other is close to the other insulator on the diagonal line of the car floor. A problem associated with this system arises from a bias load on the car floor. That is, when the passengers stand on one side of the car floor, there could occur a phenomenon that one rubber insulator subsides deeply and the other makes no subsidence depending on the position where the load is placed. In this case, if two switches are connected to operate in parallel, they might be operated by a load smaller than the rated load. Also, if they are connected to operate in series, the bias load detecting performance will be unsatisfactory as it may occur that the switches will not operate unless the load applied on the floor is far above the rated load.

SUMMARY OF THE INVENTION

In order to eliminate these problems, the present invention has an object thereof to provide a scaling device for an elevator car which can be operated without being influenced by flexure of the car floor.

Another object of the present invention is to provide a scaling device for an elevator car which can be operated accurately without any adjustments after installation of the elevator car.

Still another object of the present invention is to provide a scaling device for an elevator car which can be operated accurately without being influenced by bias load applied on the car floor.

For accomplishing the above objects, according to the present invention there is provided a scaling device for an elevator car which has a car floor on which an elevator car is set, vibration insulators disposed below the car floor, beams disposed at the underside of the car floor and arranged to subside in conformity to the vertical displacement of the car floor caused by deformation of the vibration insulators, and a load detector mounted under the beams and designed to be operated by the vertical displacement of the beams, wherein the beams are supported by the car floor such that only the vertical displacement of the car floor is transmitted to the beams.

DESCRIPTION OF THE PREFERRED EMBODIMENTS

Figure 1:
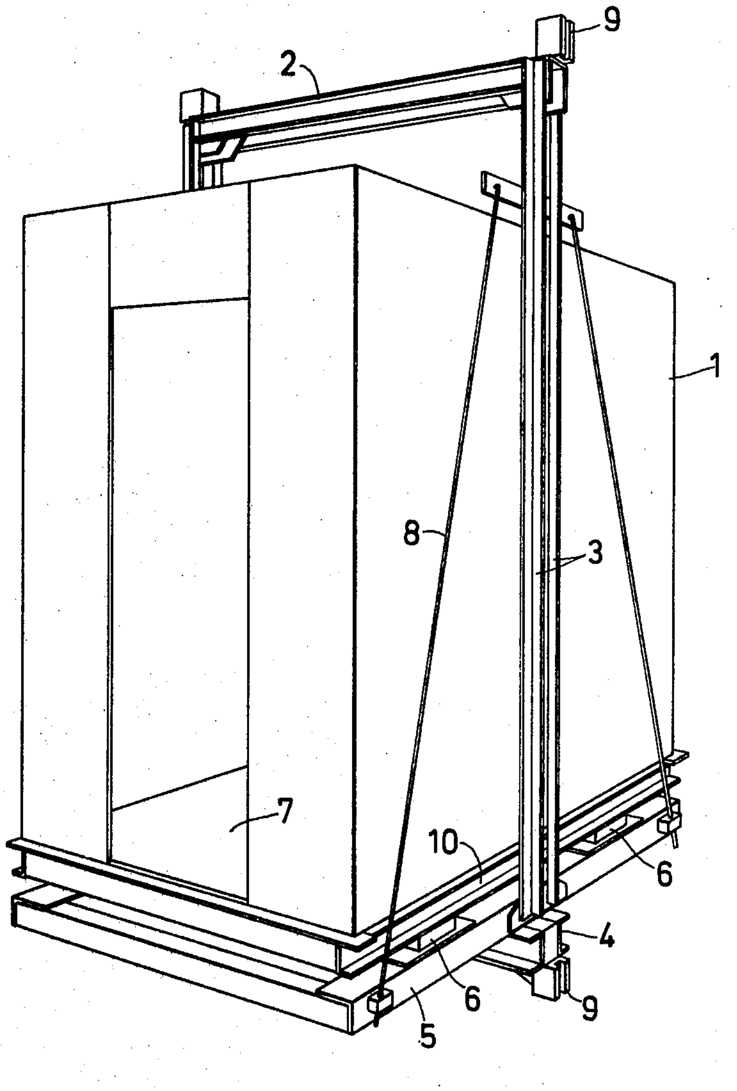
FIG. 1 is a perspective view of a typical elevator car which can be applied to the present invention, particularly showing a car frame and associated parts nearby.

Referring now to the FIG. 1 of the drawing, an elevator cage 1 is supported on a car frame which is constructed by an upper frame 10, under frame 5, and a base frame 4. A car floor 7 is set on the upper frame 10 which is made of a quadrate steel frame. There are provided reinforcement members supporting the under frame 5, such as a cross head 2, slings 3, tie rods 8, and a guide rail 9. In such an elevator car, cage 1 and its supporting upper frame 10 are insulated through elastic material such as rubber or spring from any parts in connection with the car frame so that sound or vibration are absorbed by rubber pads 6, which are placed under the upper frame 10 and desposed between the upper frame 10 and the under frame 5.

Figure 2:
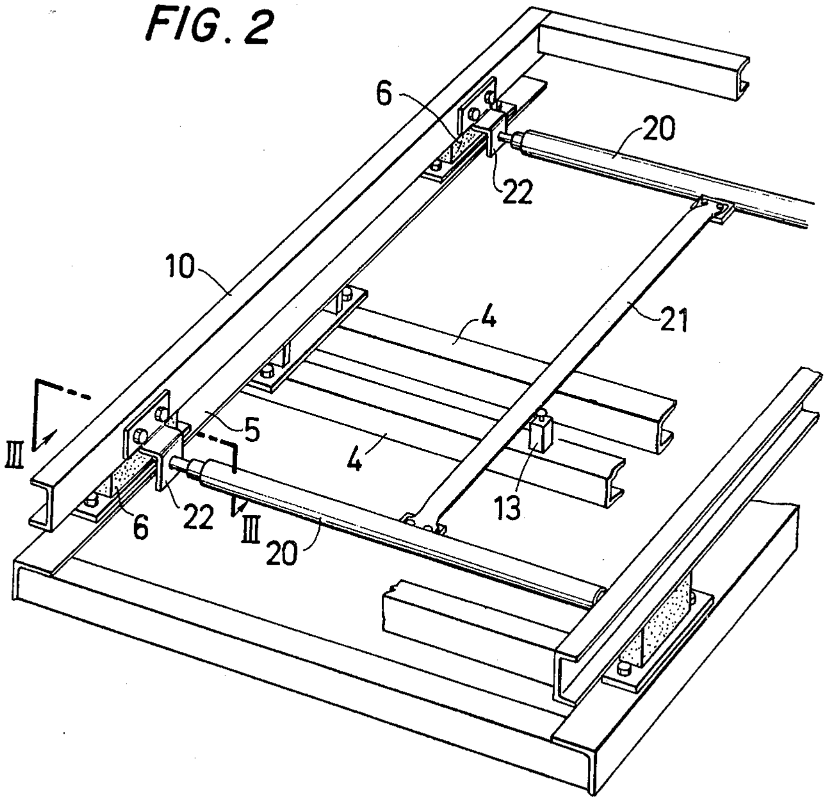
FIG. 2 is a perspective view of a scaling device of the present invention, taken through the upper side of the car frame in which the car floor is removed.

The interior arrangement, partially shown in the FIG. 2, includes load detecting beams 20, each end of whichis supported by the upper frame 10 through a bearing 22, and a connecting beam 21, each end of which is jointed to the middle part of the detecting beams 20. A switch 13 is mounted on the base 4 and arranged to be operated by subsidence of the connecting beam 21. The detecting beams 20 and the bearing 22 are joined together by fitting in such a way as to permit rotation, swiveling and sliding.

Figure 3:
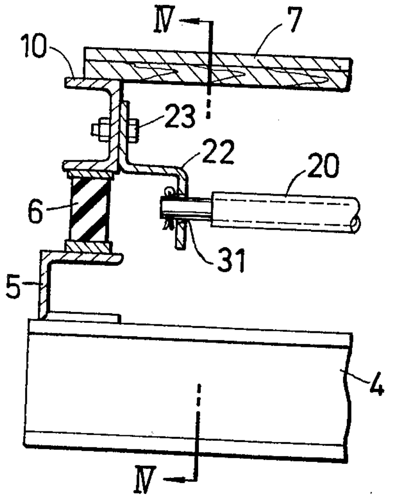
FIG. 3 is a sectional view of the scaling device taken on line III—III in the FIG. 2.
Figure 4:
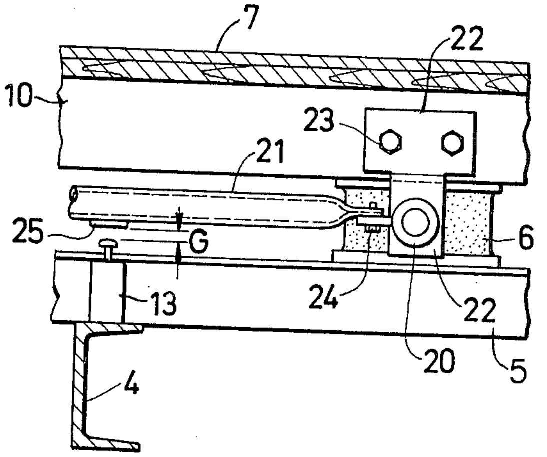
FIG. 4 is a sectional view of the scaling device taken on line IV—IV in the FIG. 3.

Detailed explanation of the jointing part of the detecting beam 20 and bearing 22 is shown in the FIG. 3 and FIG. 4. Referring now to the FIG. 3, the end of the detecing beam 20 is supported in a hole 31 of the bearing 22. The diameter of the hole 31 is slightly larger than that of the end of the detecting beams 20 so that the detecting beam 20 can swivel and slide to in a predetermined extent. The bearing 22 is fixed on the upper frame 10 by a bolt 23. The rubber pad 6 is mounted by seizure on the upper frame 10 and the under frame 5.

Referring now to FIG. 4, the connecting beam 21 is jointed on the middle of the detecting beam 20 by a bolt 24. The switch 13 is secured on the base 4 and a gap G between the top of the switch 13 and a plate 25 secured on the connecting beam 21 is adjusted such that it becomes equal to the amount of the deformation of the rubber pad 6 at a state in which the rated load is applied on the floor 7.

In this embodiment, when a load is applied on the floor 7, although the floor 7 deforms in bow-shape and the bearing 22 tilts corresponding to the deformation of the floor 7, no bending moment develops on the detecting beam 20 because the detecting beam 20 is jointed to the bearing 22 to swivel and slide.

As apparent from the foregoing explanation, the detecting beam 20 and the connecting beam 21 are not the least affected by deformation of the car floor 7, so that it is sufficient to adjust the gap G merely equal to the amount of subsidence of the rubber pad 6 at a state in which the rated load is applied on the car floor 7.

As the amount of subsidence of each rubber pad 6 can be easily determined if the rated load and the elastic constant of the rubber pad 6 are given, it is easy to adjust the gap G in a factory, and such an adjusted gap G needs only confirmation after installation of the elevator car. It is to be also noted that in one embodiment of the present invention, tubular beams are used for the detecting beams 20 and the connecting beam 21, instead of angle beams, so that they may not suffer a kink and make an error in detecting value. Tubular beams are preferable to use for these beams because their rigidity in section has no directional qualities.

According to the embodiment of the present invention, as the scaling device can be adjusted in the factory before installation, there can be achieved marked improvement in workability, accuracy and detectivity of bias load as compared with the conventional system where the scaling device is adjusted after installation. To put it more specially, in the conventional system in which two switches are often provided to obtain better accuracy for bias load and mounted on a diagonal line under to the rubber pads, if a bias load is applied such that only 2/3 portion of the floor receives the load, the detection error could range from −30% to +70%, but according to the present system, such error is confined within 10%. Also, two switches can be reduced to one. Further, in conventional system, due to deformation of the floor, there would be produced flexure of the beams to induce detection error of around 15%, on the other hand, according to the present system, no flexure, kink and twist of the beams are produced, and thus detection error is eliminated.

Figure 5:
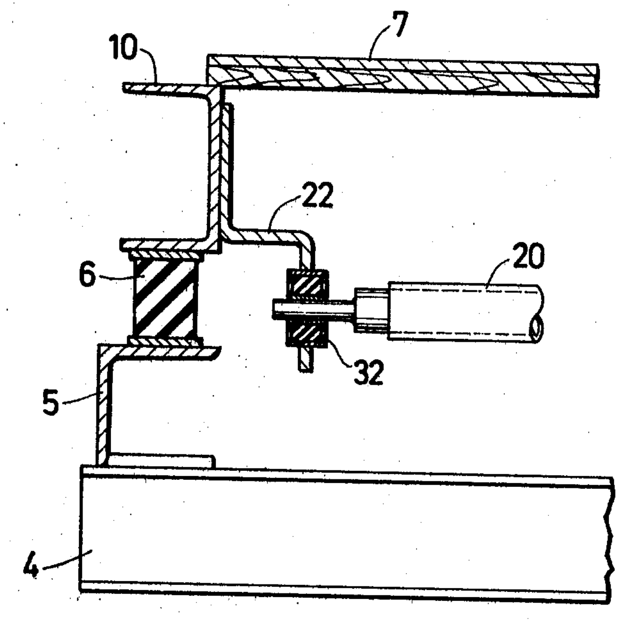
FIG. 5 and FIG. 6 are respectively sectional views of other embodiments of the present invention.

FIG. 5 shows an another embodiment of the present invention. In this embodiment, the bearing 22 and the detecting beam 20 are flexibly jointed by an elastic coupling such as a cylindrical rubber vibration insulator 32 mounted in the bearing 22. Each end of the detecting beams 20 is interposed in the cylindrical rubber insulator 32 so that the load applied on the floor 7 is transmitted to the detecting beam 20, and no bending force caused by the deformation of the car floor 7 is transmitted to the detecting beams 20. This produces the same effect as the above described loose joint system of FIG. 2, FIG. 3 and FIG. 4.

Figure 6:
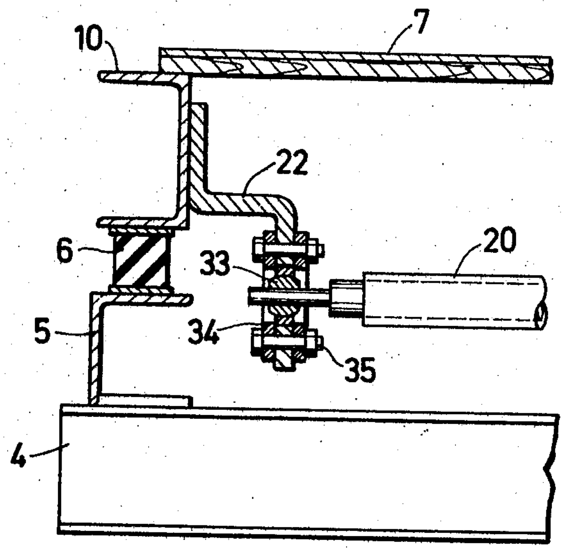

Referring now to the FIG. 6, a swivel bearing such as a spherical bearing is employed in place of the elastic coupling of FIG. 5. The spherical roller 33 is retained in a bearing cover 34 which is mounted in the bearing 22 by bolts 35. When the car floor deforms by a load applied on the car floor, the rubber pad 6 deforms with an inclination and the bearing 22 is tilted. However, due to the swivel movement of the roller 33, only vertical movement caused by the deformation of the rubber pad 6 is transmitted and no bending moment is transmitted to the detecting beam 20.

After all, the above described effect of the present invention can be obtained by employing a supporting structure of the load detecting beams which does not allow transmission of deformation of the car floor to the load detecting beams.

In the foregoing embodiment of the present invention, an electrical on-off switch for detecting the displacement of the load detecting beams is employed, however, it is possible to use a means for electrically detecting the displacement of the load detecting beams, such as for example a differential transformer.

Also, the present invention has been described with employing a switch for detecting the load that exceeds the rated load, however, it is possible to obtain the object of the invention by using a means to detect a load lower than the rated load.

While there is shown what is considered at present to be preferred embodiment of the present invention, it is of course understood that various other modifications may be made therein, and it is intended to cover in the appended claims all such modifications as fall within the true spirit and scope of the invention.

What is claimed is:

1. In a scaling device for an elevator having an elevator car with a car floor, a frame structure for supporting said car, resilient vibration insulators disposed supportingly between said car and said frame structure to reduce the vibration transmission between said car and said frame structure, load detecting beams means being carried by said car to move in conformity to a displacement of said car relative to said frame structure as caused by deformation of said vibration insulators under load, load detecting transducer means being carried by one of said frame structure and said load detecting beam means in an adjacent position with respect to the other so that a predetermined relative vertical movement of said car and and frame structure as caused by a predetermined load resiliiently deforming said vibration insulators will cause said load detecting beam means and frame structure to operate said load detecting transducer means and produce a corresponding load signal, wherein the improvement comprises in combination means mounting said load detecting beam means to said car, said mounting means being provided with swivel lost motion and horizontal sliding lost motion so that bending moments caused in said car will not be transmitted to said load detecting beam means.

2. The device of claim 1, wherein said mounting means each are disposed adjacent a corresponding one of said vibration insulators, respectively.

3. In a scaling device for an elevator having an elevator car with a car floor, frame structure for supporting said car, resilient vibration insulators disposed below said car floor and supportingly between said car and said frame structure to reduce the vibration transmission between said car and said frame structure, load detecting beam means carried by said car beneath said car floor and arranged to move to conformity to a displacement of said car relative to said frame structure as caused by deformation of said vibration insulators under load, load detecting transducer means mounted on one of said load detecting beam means and said frame structure in a position adjacent the other so that a predetermined relative movement between said car and frame structure as caused by a predetermined load resiliently deforming said vibration insulators will cause said load detecting beam means to operate said load detecting transducer means and produce a correspondingly load signal, wherein the improvement comprises in combination means mounting said load detecting beam means on said car, said mounting means being provided with swivel lost motion and horizontal sliding lost motion so that bending moments caused in said car will not be transmitted to said load detecting beam means.

4. A scaling device as defined in claim 3, further including: said car having an upper frame and a load carrying floor mounted on said upper frame; said frame structure having an under frame provided below said car upper frame, and said vibration insulators being disposed between said under frame and said upper frame so as to reduce the vibration of said car floor, said mounting means comprising a joint connecting said upper frame with the associated beam means end.

5. The device of claim 4, wherein said joint is secured to said upper frame at the position of one of said vibration insulators.

6. A scaling device as defined in claim 4, wherein said load detecting beam means comprise a plurality of connected tubes.

7. A scaling device as defined in claim 4, wherein said joint is provided at each end of said load detecting beam means.

8. A scaling device as defined in claim 7, wherein each end of said load detecting beams is loosely supported in an oversized hole of its respective joint.

9. A scaling device as defined in claim 8, wherein each end of said load detecting beam means is supported by its respective joint with said joints being on opposite side of said upper frame.

10. A scaling device as defined in claim 9, wherein said load detecting beam means comprise a plurality of connected tubes.

11. A scaling device as defined in claim 7, wherein each of said load detecting beams is flexibly supported on said upper frame by its respective joints.

12. A scaling device as defined in claim 11, wherein said joints are rigidly fixed on opposite sides of said upper frame, each end of said load detecting beams is inserted in a hole provided by said joint and for each of said joints an elastic material is provided within said hole and around said load detecting beam means end to provide a flexible support for said load detecting beam means.

13. A scaling device as defined in claim 12, wherein said load detecting beam means comprise a plurality of connected tubes.

14. A scaling device as defined in claim 7, wherein each end of said load detecting beam means is pivotally supported on said upper frame by said joints.

15. A scaling device as defined in claim 14, wherein said joints are rigidly fixed on opposite sides of said upper frame and each of said joints includes a spherical bearing for supporting the associated end of said load detecting beam means.

16. A scaling device as defined in claim 15, wherein said load detecting beam means comprise a plurality of connected tubes.

17. An elevator having a scaling device, comprising: an elevator car having a load supporting car floor, an upper frame supporting and secured to said car floor, a frame structure having an under frame provided below said upper frame, vibration insulators disposed between said upper frame and said under frame so as to resiliently deform by relative movement between said upper frame and said lower frame in correspondence with changes in loads being carried by said car, a pair of tubular beams parallel to each other and disposed beneath said car floor and respectively drivingly connected at their opposite ends to said car floor so as to be vertically displaced in correspondence with vertical displacement of said elevator car as caused by deformation of said vibration insulators, and each of said tubular beams having its driving connection at one end loosely jointed on said upper frame so that bending moments caused in said car will not be transmitted to said tubular beams, an additional beam disposed beneath said car floor and having its opposite ends respectively secured to the midportions of said parallel tubular beams, and a load detecting transducer means mounted beneath said car floor immediately between the middle of said additional beam and said frame structure so as to be operated by a predetermined relative vertical movement between said additional beam and said frame structure during the deformation of said resilient vibration insulators.

* * * * *